H. C. Bell.
Churn.
N° 75842.     Patented Mar 24, 1868.
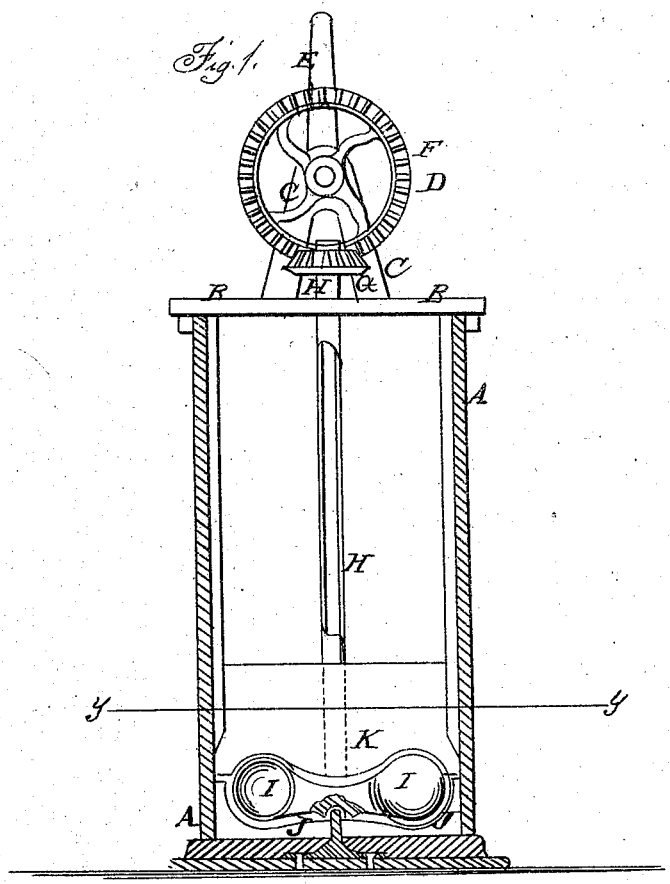
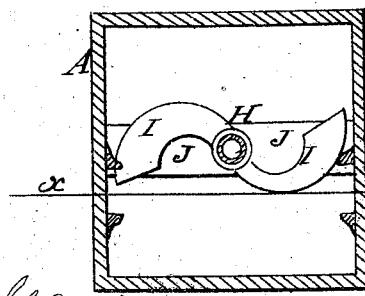
Witnesses
Theo Tusche
J. A. Fraser
Inventor
H. C. Bell
Per Munn & Co
Attorneys

United States Patent Office.

HENRY C. BELL, OF HEYWORTH, ILLINOIS.

Letters Patent No. 75,842, dated March 24, 1868.

IMPROVEMENT IN CHURNS.

The Schedule referred to in these Letters Patent and making part of the same.

TO ALL WHOM IT MAY CONCERN:

Be it known that I, HENRY C. BELL, of Heyworth, in the county of McLean, and State of Illinois, have invented a new and useful Improvement in Churns; and I do hereby declare that the following is a full, clear, and exact description thereof, which will enable those skilled in the art to make and use the same, reference being had to the accompanying drawings, forming part of this specification, in which—

Figure 1 is a vertical longitudinal section of my improved churn, taken through the line $x\,x$, fig. 2.

Figure 2 is a horizontal cross-section of the same, taken through the line $y\,y$, fig. 1.

Similar letters of reference indicate corresponding parts.

My invention has for its object to furnish an improved churn, simple in construction, easily operated, and which will develop all the butter that may be in the milk in a very short time; and it consists in the construction, combination, and arrangement of the hollow dasher-shaft, curved funnel-shaped dasher, and partition-boards with each other and with the body of the churn, the whole being constructed and arranged as hereinafter more fully described.

A is the body of the churn, which is a square box of any desired size, according to the amount of cream to be churned at a time. The body, A, of the churn may be made round, if desired, but I prefer to make it square, as the angles more effectually break up the currents caused by the action of the dasher. B is the cover of the churn, to one part of which, or to the upper part of the body of the churn, are attached supports or standards, C, in bearings in the upper ends of which works the horizontal shaft D. To the outer end of the shaft D is attached the crank E, and to its inner end is attached a large bevel-gear wheel, F, the teeth of which mesh into the teeth of the small bevel-gear wheel G, attached to the upper end of the dasher-shaft H. The dasher-shaft H passes through and works in bearings in the centre of the cover B, and in its lower end is formed a socket, which works upon a pivot attached to the centre of the churn-bottom. The dasher-shaft H is made hollow, or tubular, and to its lower end are attached two or more curved funnels, I, the interior of which communicate with the interior of the tubular shaft H. J is a partition-board, extending across the body A of the churn below the funnels I, and the upper edge of which is notched, so as to fit more closely to the said revolving funnel-dasher. K is a removable partition-board, extending across the body of the churn in a vertical position, and the ends of which enter and move up and down in grooves in the sides of said churn-body, as shown in figs. 1 and 2.

As the dasher is revolved through the cream, the tendency is to form a vacuum in the rear of the mouths of the funnels I, to fill which vacuum the air rushes in through the shaft H, and escaping from said funnels rises through the cream, throwing it into violent agitation. At the same time the revolution of the dasher through the cream communicates to it a rotary motion, or throws it into circular currents, which are broken up by the corners or angles of the churn-body A, and more especially by the partition-boards J and K, thus increasing the agitation of the cream, so that the churning is accomplished in a very short time, developing all the butter that may be in said cream.

Being aware of the patents granted to William Weddington, dated July 23, 1867, for a hollow dasher, and to H. Aldrich, February 7, 1865, for vertical partition-boards, I do not wish to claim these features broadly; but

What I claim as new, and desire to secure by Letters Patent, is—

The combination of the tubular dasher-shaft H, two or more curved funnels I, and the vertical partition-boards J and K with each other and with the body A of the churn, substantially as herein shown and described, and for the purpose set forth.

The above specification of my invention signed by me, this eighth day of October, 1867.

HENRY C. BELL.

Witnesses:
OWEN C. RUTLEDGE,
M. W. PRATT.